UNITED STATES PATENT OFFICE.

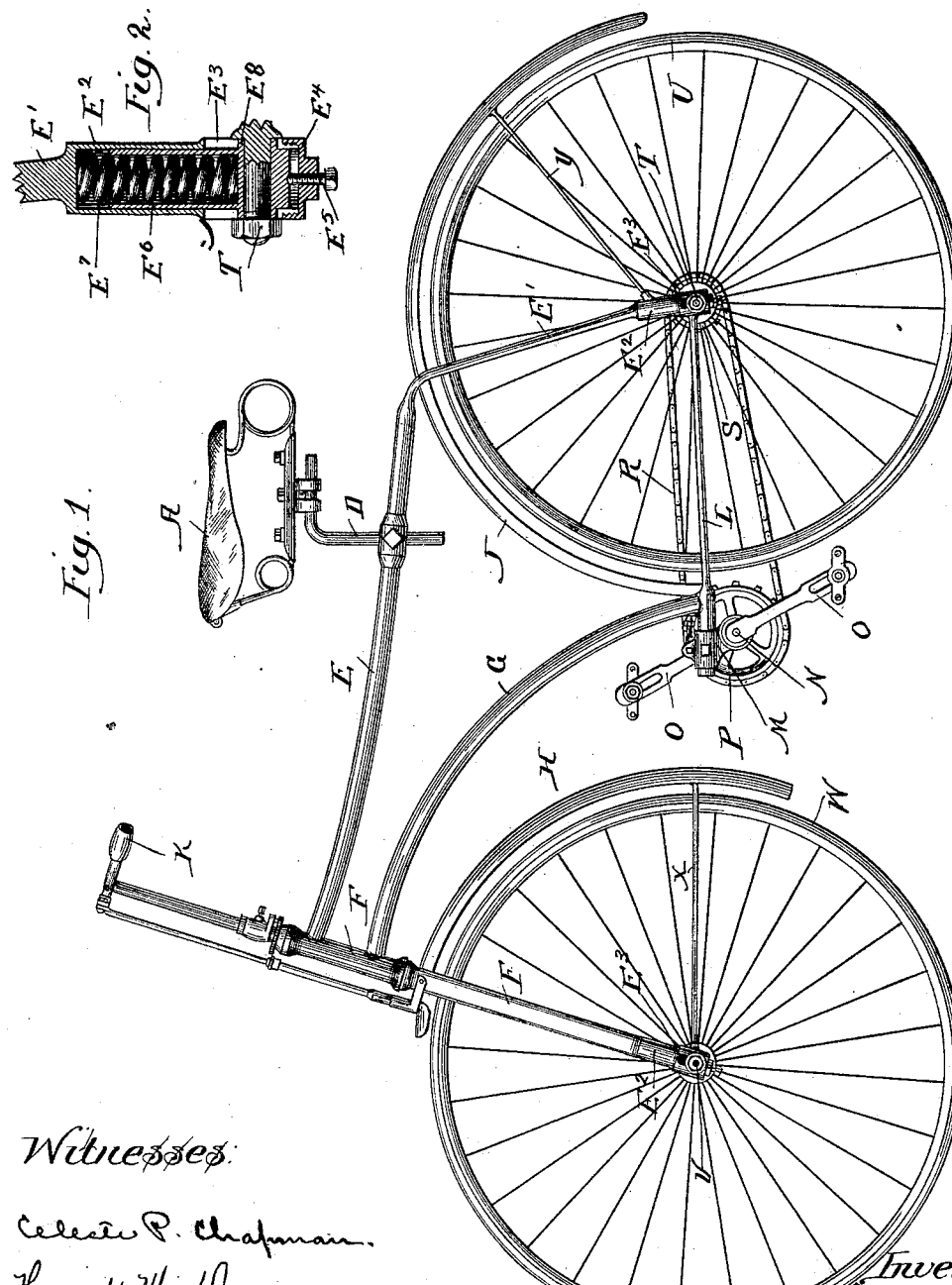

LEWIS P. HALLADAY, OF CHICAGO, ILLINOIS, ASSIGNOR OF TWO-THIRDS TO WILLIAM H. HALLADAY AND WILLIAM E. HALLADAY.

BICYCLE.

SPECIFICATION forming part of Letters Patent No. 451,429, dated April 28, 1891.

Application filed October 27, 1890. Serial No. 369,443. (No model.)

*To all whom it may concern:*

Be it known that I, LEWIS P. HALLADAY, a citizen of the United States, residing at Chicago, in the county of Cook, State of Illinois, have invented a new and useful Improvement in Bicycles, of which the following is a specification.

My invention relates to bicycles, and has for its object to provide convenient and simple means whereby the upper portion of the bicycle may be elastically supported. This object is accomplished by means of a mechanism illustrated and shown in the accompanying drawings, wherein—

Figure 1 is a side view of the bicycle with my improvements applied. Fig. 2 is a detail of the supporting-spring, its boxings, and connections.

Like parts are indicated by the same letters in both figures.

A is the seat, preferably spring-supported on an adjustable standard D, which rises from the frame-piece E. This frame-piece is rigid to the standard F, from which also projects the frame-piece G and the fender H.

J is the fender about the rear wheel.

K is the handle, and L the bifurcated frame-piece which carries a suitable frame M at its forward end, and the shaft N, pedals O O, and driving sprocket-wheel P, which drives the chain R, which leads to the sprocket-wheel S on the rear axle T. The frame-piece E is bifurcated to embrace the rear wheel U and terminates in the two ends E'. On each of these ends is formed a box or tube $E^2$, with a longitudinal slot $E^3$ below, and a screw-cap $E^4$, carrying the adjustable set-screw $E^5$. Sliding within the tubular or cup-shaped portion $E^2$ is the upwardly-opening tube $E^6$, containing spring $E^7$ and formed upon the box $E^8$, in which rests one end of the axle T.

It is of course evident that each of the parts E' is provided with a device as last above described. Each end of the bifurcated standard F is in like manner provided with a similar bearing or boxing for its axle and springs. The forward axle is lettered V and the forward wheel W. The fender H is supported below by the bars X and the fender J by the bars Y. These parts could be quite extensively altered without departing from the spirit of my invention.

The standard or portion of the frame marked F, it will be observed, is inclined at a slight angle to the vertical, and hence the obstruction to be encountered by the wheel will encounter the wheel at a point substantially in a direct line with the length of the part F. Hence the spring will receive a pressure in the proper direction and will not be inclined to cramp. A similar arrangement could be applied to the rear wheel, though it is more important with the forward wheel.

The use and operation of my invention are as follows: In a bicycle where a frame is supported upon an axle by springs or with cushions interposed between the axle and the frame on each side of the wheel it is found that the wheel tends to incline toward one or the other of them and wear or cut the same when one spring is compressed slightly more than the other—that is to say, where the wheel runs between the bifurcated ends of the frame-support and such ends are provided with cushions which rest upon the axle the wheel will strike one or the other of the ends whenever one of such cushions is further compressed than the other. In the device illustrated this result is obviated by providing for each cushion or spring a boxing of long and close-fitting bearings, so that the wheel cannot thus change or incline its axle with relation to the plane of the frame. When the rider in manipulating the wheel passes over obstructions, so long as he is erect and the machine moving in a straight line the give of the various supporting-springs will be practically equal and the object of elastically supporting the rider will be accomplished. If now the rider for the purpose of moving the machine about a circle inclines toward one side, the heavier weight is thrown upon the springs on that side, and they would tend to be compressed thus to permit the upper portion of the wheel to incline toward one side, and thus the upper portion of the wheel would be forced against the inside of the part F or E' lying on the outside of such curve. The sliding or telescoping tubes or cup-shaped pieces $E^2$ and $E^6$ fit so closely and have such a relatively great length of bearing one upon the other that the instant the wheel tends thus to incline the two tubes immediately clamp one upon the other, so as to lock them from further motion, and thus prevent further compression of the springs. In this event the wheel must be substantially in the same plane with reference to the body of the machine, and hence cannot come in contact with its standards.

I claim—

1. In a bicycle, the combination of wheels and axles with a frame, said axles having upwardly-projecting boxings thereon, said frame having downwardly-extending inverted boxings, and elastic cushions placed within and inclosed by said boxings, so as to permit them to elastically telescope one within the other.

2. In a bicycle, the combination of wheels and axles with a frame the ends of which are bifurcated to inclose the wheels, telescoping boxings upon such axles and frame ends, and elastic cushions interposed between the same, said boxings having long close-fitting bearings, so that when one spring tends to be compressed more than the other the parts are locked together to prevent further compression.

3. In a bicycle, the combination of wheels and axles with a frame the ends of which are bifurcated to inclose the wheels, and telescopic boxings on the extremities of such frame ends and axles, and springs within such boxings, said boxings provided with long close-fitting bearings.

LEWIS P. HALLADAY.

Witnesses:
CELESTE P. CHAPMAN,
HARRIET M. DAY.